US011091047B2

(12) United States Patent
Raaijmakers (10) Patent No.: US 11,091,047 B2
(45) Date of Patent: Aug. 17, 2021

(54) DEVICE FOR CHARGING AN ELECTRIC VEHICLE AND A METHOD FOR VERIFYING THE CONTACT BETWEEN A DEVICE FOR CHARGING AN ELECTRIC VEHICLE AND THE ELECTRIC VEHICLE

(71) Applicant: ABB Schweiz AG, Baden (CH)

(72) Inventor: Stefan Raaijmakers, Delft (NL)

(73) Assignee: ABB Schweiz AG, Baden (CH)

( * ) Notice: Subject to any disclaimer, the term of this patent is extended or adjusted under 35 U.S.C. 154(b) by 205 days.

(21) Appl. No.: 16/222,103

(22) Filed: Dec. 17, 2018

(65) Prior Publication Data
US 2019/0193585 A1 Jun. 27, 2019

Related U.S. Application Data

(63) Continuation of application No. PCT/EP2017/064611, filed on Jun. 14, 2017.

(30) Foreign Application Priority Data

Jun. 17, 2016 (EP) .................................... 16175040

(51) Int. Cl.
*B60L 53/16* (2019.01)
*B60L 53/30* (2019.01)
(Continued)

(52) U.S. Cl.
CPC ................. *B60L 53/16* (2019.02); *B60L 3/04* (2013.01); *B60L 5/24* (2013.01); *B60L 53/11* (2019.02);
(Continued)

(58) Field of Classification Search
CPC .......... B60L 53/11; B60L 53/16; B60L 53/18; B60L 53/32; B60L 2200/12;
(Continued)

(56) References Cited

U.S. PATENT DOCUMENTS 9,910,092 B2 3/2018 Park et al.
2004/0135544 A1* 7/2004 King ................... H01M 10/441
320/116

(Continued)

FOREIGN PATENT DOCUMENTS

EP 2944503 A2 11/2015
EP 2962891 A1 1/2016
(Continued)

OTHER PUBLICATIONS

Machine translation of EP2944503 performed on Aug. 31, 2020, 10 pages.*
(Continued)

*Primary Examiner* — Nathaniel R Pelton
(74) *Attorney, Agent, or Firm* — Taft Stettinius & Hollister LLP (57) ABSTRACT

A device is disclosed for charging an electric vehicle. The device includes a plurality of electrical contacts, at least two of them coupled to a power supply, and each electrical contact of the plurality of electrical contacts is arranged for contacting a different contact surface of the electric vehicle. The device also includes a secondary contact forming a contact arrangement with one of the electrical contacts of the plurality of electrical contacts. The electrical contact and the secondary contact of the contact arrangement are arranged to contact the same contact surface of the vehicle.

8 Claims, 3 Drawing Sheets

(51) Int. Cl.
  *B60L 53/18* (2019.01)
  *B60L 5/24* (2006.01)
  *B60L 3/04* (2006.01)
  *B60L 53/10* (2019.01)
(52) U.S. Cl.
  CPC ............... *B60L 53/18* (2019.02); *B60L 53/32* (2019.02); *B60L 2200/12* (2013.01); *B60L 2200/18* (2013.01); *Y02T 10/70* (2013.01); *Y02T 10/7072* (2013.01); *Y02T 90/12* (2013.01); *Y02T 90/14* (2013.01)
(58) Field of Classification Search
  CPC .......... B60L 2200/18; B60L 3/04; B60L 5/24; Y02T 10/70; Y02T 10/7072; Y02T 90/12; Y02T 90/14
  USPC .......................................................... 320/109
  See application file for complete search history.

(56) References Cited

U.S. PATENT DOCUMENTS

2010/0283477 A1* 11/2010 Vanaud .................. B61F 9/005
  324/538
2012/0062385 A1* 3/2012 Wiesemann ............ B60R 16/00
  340/635
2013/0313918 A1 11/2013 Nolewaika
2014/0292274 A1* 10/2014 Dorval ..................... B60L 3/04
  320/109

FOREIGN PATENT DOCUMENTS

WO   2015169326 A1   11/2015
WO   2016056740 A1   4/2016

OTHER PUBLICATIONS

European Patent Office, International Search Report & Written Opinion issued in corresponding Application No. PCT/EP2017/064611, dated Oct. 16, 2017, 10 pp.
European Patent Office, Extended Search Report issued in corresponding Application No. 16175040.1, dated Nov. 24, 2016, 7 pp.
Canadian Patent Office, Office Action issued in corresponding Application No. 3,028,016, dated Jul. 9, 2020, 6 pp.
European Patent Office, Office Action issued in corresponding Application No. 17729493.1, dated Feb. 25, 2021, 6 pp.
Mexican Patent Office, Office Action issued in corresponding Application No. MX/a/2018/015850, dated Mar. 2, 2021, 6 pp.

* cited by examiner

DEVICE FOR CHARGING AN ELECTRIC VEHICLE AND A METHOD FOR VERIFYING THE CONTACT BETWEEN A DEVICE FOR CHARGING AN ELECTRIC VEHICLE AND THE ELECTRIC VEHICLE

TECHNICAL FIELD

The present invention relates to the technical field of electric vehicle charging infrastructure. In particular, it is directed to a device for charging an electrical vehicle as well as to a method for verifying the contact between a device for charging an electric vehicle and an electric vehicle.

BACKGROUND ART

Charging stations or devices for charging electrical vehicles are well known to the person skilled in the art. For example, from DE 20 2015 102 998.5 a charging station for charging an electric bus is known. For electric cars, devices for charging electric cars are also well known.

Electric vehicles are becoming more and more common, and so are the devices for charging them. Passenger cars may be charged with a cable from a regular mains connection in a few hours time. When shorter charging times are required, quick chargers—also call fast chargers—can be used, with the aid of which a vehicle can be charged in about a quarter of an hour. When doing so, relatively large and therefor dangerous current levels may occur, and for that reason, special protected connectors are used. Although safety is improved with these connectors, the ease of connecting and disconnecting is not, and that makes them less convenient for large scale charging situations, as for instance take place at charging stations in a depot for public transport busses. Public transport busses might alternatively or in addition be charged with such charging stations at a bus stop.

Vehicles need to be charged in a relatively short time, with as little effort as possible. Instead of wiring the vehicle a charger by means of a cable with connectors, it is known to provide the bus with roof connectors, and to provide a charging station with contacts that can be moved against the connectors. The German patent DE 10 2013 201 491 A1 gives an example, wherein the contacts are movable by means of a hydraulically operable pantograph, which is also known as an actuator.

Although reasonable results are obtained with this state of the art charger, several disadvantages exist. These arise mainly from uncertainty of the various power connections made between the device for charging and the vehicle. Bad contacts may arise from bad mutual positioning of the vehicle and the charger or contamination, and may lead to power losses, longer charging times and moreover, dangerous situations.

A problem with the known contact arrangement of devices for charging electrical vehicles are contaminated or soiled electrical contacts which results in a bad or unreliable electrical connection. In particular, a good contact between the electrical contacts of the device for charging the electric vehicle and the respective contact surface of the vehicle cannot always be guaranteed. In case of an electrical vehicle such as an electrical bus having its electrical contacts on the roof, the contaminated or soiled electrical contacts might result from dust, dirt or moisture, and, for example during wintertime, from snow or ice.

This problem might result in electrical contacts being overheated due to increased electrical resistance or more generally increased electrical impedance. Another, problem might be that the electrical connection might not be established due a too high electrical impedance, which might be the case with contacts used for communication and the like.

DISCLOSURE OF INVENTION

It is an object of the present invention to provide a device for charging an electric vehicle by using a reliable electrical connection before supplying power for charging the electric vehicle.

It is a goal of the present invention to take away the disadvantages of the prior art and to provide at least a useful alternative.

According to a first aspect of the invention, the device for charging an electric vehicle comprises a plurality of electrical contacts, at least two of them being coupled to a power supply. Each electrical contact of the plurality of electrical contacts is arranged for contacting a different contact surface of the electric vehicle. The device further comprises a secondary contact forming a contact arrangement with one of the electrical contacts of the plurality of electrical contacts. Said electrical contact and the secondary contact of the contact arrangement are arranged to contact the same contact surface of the electrical vehicle.

The device according to the invention having the contact arrangement comprising the secondary contact provides the device with a separated contact which can be used by the device to determine or at least estimate the contact resistance, or more generally to determine or at least estimate the contact impedance, of the electrical contact of the contact arrangement to the contact surface of the vehicle when contacted.

According to a modified embodiment of the invention, the device is configured for measuring the electric impedance between the electrical contact of the contact arrangement and the secondary contact of the contact arrangement when said same contact surface of the electrical vehicle is contacted by the electrical contact of the contact arrangement and the secondary contact of the contact arrangement.

The device is thus enabled to determine the maximal contact impedance between the electrical contact of the contact arrangement and the corresponding contact of the electrical vehicle as the maximal contact impedance is equal to the measured contact impedance. Thus by measuring the maximal contact impedance the reliability of the electrical connection between the device for charging an electric vehicle and the electrical vehicle can be determined. The measured electric impedance gives a good indication of the quality of the connection.

Further, during the measurement of the impedance, the impedance might get reduced. Thus it is a further advantage of the device according to the invention, that the initial contact impedance between the electrical contact of the contact arrangement and the secondary contact might get reduced, as will be explained in further details below.

According to a modified embodiment of the invention, the contact arrangement formed by the electrical contact and the respective secondary contact is a first contact arrangement and a second contact arrangement is formed by one of the electrical contacts of the plurality of electrical contacts which is not part of the first contact arrangement and a respective secondary contact of the second contact arrangement wherein the electrical contact of the second contact arrangement and the secondary contact of the second contact arrangement are arranged to contact the same contact surface of the vehicle, and wherein the device is configured for measuring the electric impedance between the secondary contact of the first contact arrangement and the secondary contact of the second contact arrangement.

This embodiment has the advantage that the impedance between the electrical contact of the first contact arrangement and the electrical contact of the second contact arrangement can reliably be determined.

According to a modified embodiment of the invention, the electrical contact of the first contact arrangement and the electrical contact of the second contact arrangement are coupled to the stationary power supply. This embodiment has the advantage that the impedance of the charging circuitry can reliably be determined.

According to a modified embodiment of the invention, the device is further configured for enabling and/or maintaining the supply of power to the vehicle via the at least two electrical contacts coupled to a power supply only when the measured electric impedance is below a predetermined threshold.

This embodiment has the advantage that in case the impedance is above said threshold, a poor or wrong connection is assumed, and the cause of such should be determined before the supply of power to the vehicle is enabled. In case the supply of power to the vehicle was already enabled, the supply of power to the vehicle should be stopped in case the impedance is above said threshold, for example for security reasons.

According to a modified embodiment of the invention, the device comprises a fixed support frame and a movable contact frame to which the plurality of electrical contacts are attached, and an actuator attached to the fixed support frame for moving the movable contact frame to engage the plurality of electrical contacts with the respective contact surface of the electrical vehicle.

The actuator might be a hydraulically or pneumatically operated actuator. Alternatively, also an electromotor might be used as the actuator. Further, the actuator might be mechanically connected to or integrated into a pantograph-like mechanical connection between the fixed support frame and the movable contract frame.

According to a modified embodiment of the invention, the device is configured for measuring the electric impedance between the electrical contact of the contact arrangement and the secondary contact of the contact arrangement by determining the current when a predetermined voltage is applied between said electrical contact of the contact arrangement and said secondary contact of the contact arrangement.

According to a modified embodiment of the invention, the device is configured for measuring the electric impedance between the electrical contact of the contact arrangement and the secondary contact of the contact arrangement by providing an electrical source connected to said electrical contact of the contact arrangement and said secondary contact of the contact arrangement, and wherein the measurement of the electric impedance is carried out in a closed electrical circuit formed by the source, the electrical contact of the contact arrangement, the secondary contact of the contact arrangement and the contact surface of the vehicle contacted by the electrical contact of the contact arrangement and the secondary contact of the contact arrangement.

According to a modified embodiment of the above mentioned embodiment of the invention, it is preferred that the electrical source has a first pole, which is connected to the electrical contact of the contact arrangement, and has a second pole, which is connected to the secondary contact of the contact arrangement.

These embodiments have the advantage that the quality of the electric contact between the electrical contact of the contact arrangement and the respective contact surface of the vehicle can be determined independently from the other electrical contacts of the plurality of electrical contacts.

According to a modified embodiment of the invention, the device is configured for measuring the electric impedance between the electrical contact of the contact arrangement and the secondary contact of the contact arrangement by determining the voltage between said electrical contact of the contact arrangement and said secondary contact of the contact arrangement when a predetermined current is sent through said electrical contact of the contact arrangement and said secondary contact of the contact arrangement.

According to a modified embodiment of the invention, the device is configured for applying a current of at least 10 amperes, preferably of at least 25 amperes and most preferably of at least 50 amperes during the measurement.

It should be noted, that during charging, the charging current might also be lower than the above given current values.

Further, as already mentioned above, during the measurement of the impedance, the impedance might get reduced, thus it is a further advantage of the device according to the invention, that the initial contact impedance between the electrical contact of the contact arrangement and the secondary contacts gets reduced. The reduction of the impedance might result from a current, for example a current of at least 10 ampere, preferably of at least 25 amperes and most preferably of at least 50 amperes. The current might be responsible that the cause for the relatively high impedance is removed as the resistive heating will be concentrated at the relatively high impedance. Thus, the cause for the relatively high impedance is removed by melting, burning vaporizing etc.

According to a modified embodiment of the invention, the device is configured for applying a switched or pulsed current and/or voltage during measuring the electric impedance.

This embodiment has the advantage, that since relatively high currents may lead to undesired temperatures, the device may be configured for applying a switched or pulsed current and/or voltage during the measurement for preventing an overheating of the contacts during the measurement. Herein, a peak level may correspond to a voltage or current that is representative for an actual charging situation.

According to a modified embodiment of the invention, electrical contacts of the device are bar-shaped.

According to a modified embodiment of the invention, electrical contacts are spring tensioned and/or have an arcuate shape.

According to a modified embodiment of the invention, the secondary contact is bar-shaped and/or spring tensioned and/or has an arcuate shape.

According to a modified embodiment of the invention, the plurality of electrical contacts comprise at least one electrical contact of the following list: a negative direct current contact, a positive direct current contact, a control contact and a protective earth contact.

According to a modified embodiment of the invention, the device comprises the negative direct current contact, the positive direct current contact, the control contact and the protective earth contact.

According to a modified embodiment of the invention, the plurality of electrical contacts comprise the protective earth contact, which forms with the secondary contact the contact arrangement. The advantage of this embodiment is, that the electrical impedance of the protective earth connection of the electric vehicle can be checked before voltage is applied to other electrical contacts of the plurality of electrical contacts of the device for charging the electric vehicle. In case the impedance of the protective earth connection to the electric vehicle is too high, it might be too dangerous to apply power to the other electrical contacts as a reliable grounding of the electric vehicle cannot be guaranteed. In addition, the secondary contact according to this modified embodiment might also be connected to earth or the protective earth for providing a redundant connection to earth and thus for providing an increased security. Further, as explained above, it is possible to reduce the electric contact impedance between the electrical contact, which is in this embodiment the protective earth contact, of the contact arrangement and the secondary contact of the contact arrangement. As no current or at least nearly no current is allowed to flow from the protective earth contact of the vehicle to ground or earth, it is still possible by the present, modified embodiment to allow a current flow for reducing the contact impedance between the electric contact of the contact arrangement and the respective contact surface of the electric vehicle. The same might also be used for improving the contact impedance for contacts having under normal operation comparatively low current compared to the electrical contacts coupled to the stationary power supply such for example a control contact.

According to a modified embodiment of the invention, the device comprises a plurality of secondary contacts, each secondary contact forms a contact arrangement with one of the electrical contacts, wherein the electrical contact and the secondary contact of the same contact arrangement are arranged to contact the same contact surface of the electrical vehicle; and wherein the device is configured, for each contact arrangement, for measuring the electric impedance between the electrical contact and the secondary contact of the respective contact arrangement when said respective contact surface of the electrical vehicle is contacted by the electrical contact and the secondary contact of the same contact arrangement. The advantage of this embodiment is, that the electrical impedance to more than one contact surface of the electric vehicle can be checked before the actual charging of the electric vehicle is initiated. By this, the reliability as well as the security can be enhanced.

According to a second aspect of the invention, the method for verifying the contact between a device for charging an electric vehicle and an electric vehicle, preferably for a device according to the first aspect of the invention, wherein the device comprises a plurality of electrical contacts, at least two of them coupled to a stationary power supply. Each of the electrical contacts is arranged for contacting a different contact surface of the electric vehicle. The device further comprises a secondary contact, forming a contact arrangement with one of the electrical contacts (24). Said electrical contact of the contact arrangement and the secondary contact of the contact arrangement are arranged to contact the same contact surface of the vehicle. The method comprises:

arranging the contact arrangement to contact the same contact surface of the vehicle; and
measuring the electric impedance between the electrical contact of the contact arrangement and the secondary contact of the contact arrangement.

The method according to the invention thus enables to measure the maximal contact impedance between the electrical contact of the contact arrangement and the corresponding contact of the electrical vehicle as the maximal contact impedance is equal to the measured contact impedance. Thus by measuring the maximal contact impedance the reliability of the electrical connection between the device for charging an electric vehicle and the electrical vehicle can be determined. The measured electric impedance give a good indication of the quality of the connection.

According to a modified embodiment of the invention, the method comprises measuring the electric impedance by determining the current when a predetermined voltage is applied between the electrical contact of the contact arrangement and the secondary contact of the contact arrangement or by determining the voltage between the electrical contact of the contact arrangement and the secondary contact of the contact arrangement when a predetermined current is sent through the electrical contact of the contact arrangement and the secondary contact of the contact arrangement.

According to a modified embodiment of the invention, the method comprises applying a current during measuring the electric impedance for lowering the contact impedance. Beside the determination of the impedance, the current is also used for lowering the electric impedance between the electrical contact of the contact arrangement and the secondary contacts. The reduction of the impedance results from a current, for example a current of at least 25 ampere or more preferably more than 50 amperes. The current removes the cause for the relatively high impedance by resistive heating, as the resistive heating is concentrated at the relatively high impedance. Thus, the cause for the relatively high impedance gets removed by melting, burning vaporizing etc.

According to a modified embodiment of the invention, the method comprises applying a current of at least 10 amperes, more preferably of at least 25 amperes and most preferably of at least 50 during measuring the electric impedance.

According to a modified embodiment of the invention, the method comprises applying a switched or pulsed current during measuring the electric impedance.

It should be noted, that it is not excluded that the contact surfaces of the vehicle as well as the plurality of electrical contacts are arranged in a respective connector, but at least in particular embodiments, they are formed by conductive pads, for instance located on the roof of the vehicle.

Further embodiments of the invention might also arise from the detailed description of the invention and/or are given by the dependent claims.

BRIEF DESCRIPTION OF DRAWINGS

These and other aspects of the invention will be apparent from and elucidated with reference to the embodiments described hereinafter.

In the purely schematic drawings.

DETAILED DESCRIPTION OF THE INVENTION

Figure 1:
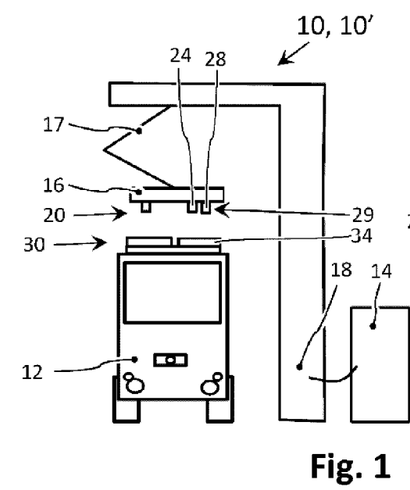
FIG. 1 shows a schematic view of a charging station and an electric vehicle to be charged by the charging station.

FIG. 1 shows a device 10 for charging an electric vehicle 12. The device might be a normal battery charger for an electric car or an electric bus or any other vehicle like an electric motorcycle, an electric bike and the like. In FIG. 1 a bus is exemplarily shown. The device 10 might also be a so-called fast charging station for fast charging such an electric vehicle 12. The device 10 can be operated with alternating current as well as with direct current. Today, for fast charging, direct current is typically used.

The electric power for charging the electric vehicle 12 is provided by a stationary power supply 14 which is typically connected to the electric grid or any other suitable power source. The stationary power supply 14 is in particular not placed within the electric vehicle 12 to be charged. In order to connect the device 10 for charging an electric vehicle 12—which is in the following shortly referred to as the charging station 10'—, the charging station 10' comprises a movable contact frame 16, which might be actuated by an actuator 17. The contact frame 16 has a plurality of electrical contacts 20, at least two of them are coupled to the power supply 14. Further, the plurality of electrical contacts 20 are each arranged for contacting a different contact surface 30 of the vehicle 12. Further, the charging station 10' might comprise a fixed support frame 18 to which the actuator 17 is connected to. Instead of fixing the actuator to a dedicated fixed support frame of the charging station, it might also be fixed to any other support structure which might already be present such as a projecting roof or the like.

Figure 2:
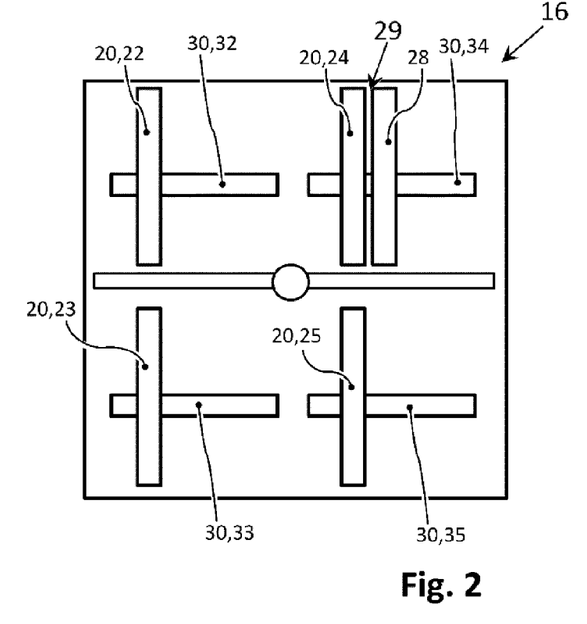
FIG. 2 shows a schematic view of a movable contact frame according to a first embodiment comprising a plurality of electrical contacts and contact surfaces on the electric vehicle to be contacted by the plurality of electrical contacts.

FIG. 2 shows the contact frame 16 with the plurality of electrical contacts 20 in more details. For example, the plurality of electrical contacts 20 has four electrical contacts 22, 23, 24, 25. However, depending on the requirements of the charging station and the charging procedure, also more or less electrical contacts might be used. For the example of direct current charging, the plurality of electrical contacts 20 might comprise a negative electric contact 22 connected to a negative potential of the power supply 14, a positive electrical contact 23 connected to a positive potential of the power supply 14, a protective earth contact 24 which is connected to earth, which is also called ground, and a control contact 25 which is used for communication between the charging station 10' and the electric vehicle 12.

Further, FIG. 2 also shows the electric contact surfaces 30 of the electric vehicle 12. Each electric contact 22, 23, 24, 25 of the plurality of electrical contacts 20 of the charging station 10' has a corresponding contact surface 32, 33, 34, 35 on the electric vehicle 12. For the above given example for direct current charging, the contact surface 32 corresponding to electric contact 22, which is the negative electric contact, is electrically connected to the energy store of the electric vehicle and the contact surface 33 corresponding to electric contact 23, which is the positive electric contact, is also electrically connected to the energy store of the electric vehicle for charging the energy store.

According to the invention, a secondary contact 28 is proved forming a contact arrangement 29 with one of the electrical contacts 20. For example, FIG. 2 shows that the secondary contact 28 is provided next to the protective earth contact 24. However, the secondary contact 28 might also be provided next to any other electrical contact 22, 23, 25 of the plurality of contacts 20. The electrical contact 24, which is in this case the protective earth contact 24, of the contact arrangement 29 and the secondary contact 28 of the contact arrangement 29 are arranged to contact the same contact surface 34 of the electric vehicle 12.

Figure 3:
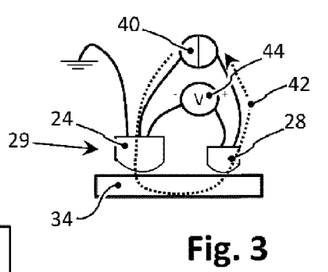
FIG. 3 shows a schematic view of a contact arrangement according to a first embodiment comprising one of the electrical contacts and a secondary contact.

In the example shown in FIG. 3, the charging station 10' is further configured for measuring the electric impedance between the electrical contact 24 of the contact arrangement 29 and the secondary contact 28 of the contact arrangement 29 when said same contact surface 34 of the electric vehicle 12 is contacted by the electrical contact 24 of the contact arrangement 29 and the secondary contact 28 of the contact arrangement 29.

The method and arrangement for measuring the electric impedance between the electrical contact 24 of the contact arrangement 29 and the secondary contact 28 of the contact arrangement 29 is explained with reference to FIG. 3. FIG. 3 shows one of the electric contact surfaces 30, the contact surface 34, contacted by the electrical contact 24 and the secondary contact 28. In the example of FIG. 3, the electrical contact 24 is the protective earth contact 24 described above, which is electrically connected to earth. Further, an electrical current or voltage source 40, which is more generally called an electrical source 40, is provided, which is connected by a first pole of the source 40 to the electrical contact 24 and by a second pole of the source to the secondary contact 28. As both, the electrical contact 24 and the secondary contact 28, contact the same contact surface 34 of the electric vehicle 12, a closed electrical circuit 42 is formed by the electrical source 40 connected to the electrical contact 24 contacting the contact surface 34 of the electric vehicle 12. The contact surface 34 is contacted by the secondary contact 28 which is also connected to the electrical source 40. In order to determine the impedance the voltage between the electrical contact 24 and the secondary contact 28 is measures by a voltage measurement device 44.

Based on the measured impedance, the charging station 10' enables the supply of power to the vehicle 12 via the at least two electrical contacts 22, 23 coupled to the power supply 14 only when the measured electric impedance between the electrical contact 24 of the contact arrangement 29 and the secondary contact 28 of the contact arrangement 29 is below a predetermined threshold.

As shown in FIG. 2, in case the negative electric contact 22, the positive electrical contact 23 and the protective earth contact 24 is present, the negative electric contact 22 and the positive electrical contact 23 are connected to the power supply 14, and the impedance of the protective earth contact 24 is determined. It is in particular preferable, that the impedance of the protective earth connection between the charging station 10' and the electric vehicle 12 does not exceed a certain, predetermined threshold, as this connection provides security, for example against electric shock. In case the impedance in the protective earth connection is too high, it might be dangerous to provide electric power from the charging station to the electric vehicle. Thus power is only provided if the impedance in below a predetermined threshold.

The measurement of the electric impedance between the electrical contact 24 of the contact arrangement 29 and the secondary contact 28 of the contact arrangement 29 might be done, as already described above, by determining the voltage by the voltage measurement device 44 between the electrical contact 24 and the secondary contact 28 of the contact arrangement 29 when a predetermined current is sent through the electrical contact 24 and the secondary contact 28 as depicted in FIG. 3 by the dotted line 42.

Other methods for measuring the impedance might also be used. For example the charging station 10' is configured for measuring the electric impedance between the electrical contact 24 of the contact arrangement 29 and the secondary contact 28 of the contact arrangement 29 by determining the current flowing in the closed current loop 42 when a predetermined voltage is applied between said electrical contact 24 and said secondary contact 28.

In both of the described methods for measuring the impedance, the applied current is preferably of at least 10 amperes, more preferably of at least 25 amperes and most preferably of at least 50 ampere during the measurement.

For example, the charging station, in particular the source 40 applies a switched or pulsed current during measuring the electric impedance between the electrical contact 24 of the contact arrangement 29 and the secondary contact 28 of the contact arrangement 29. By using a switched or pulsed current during the measuring, a more complex sensing of the contact impedance can be carried out. In case a less complex sensing is used, for example in case only a steady state DC current is applied, the measurement might only determine the ohmic contact resistance.

In a further embodiment, also a further electrical contact of the plurality of electrical contacts 20 might be equipped with a respective secondary contact to form a respective contact arrangement as well as with a further voltage or current source and a voltage measurement device as shown in FIG. 3 so that an electric contact impedance can be determined between the electrical contact of the respective contact arrangement and the secondary contact of the same contact arrangement when the same contact surface of the vehicle is contacted by the electrical contact of the respective contact arrangement and the secondary contact of the same contact arrangement. Further, the charging station might also be equipped for several or for each electrical contact with such a contact arrangement.

In a further example, which is essentially equal to the one described above with respect to FIG. 3, the electrical contact 20 of the contact arrangement might be, instead of the protective earth contact 24, the negative electric contact 22 or the positive electric contact 23. In this case the measuring of the impedance might also be done during charging for monitoring the impedance during charging. Further, the current used for determining the impedance in the closed electrical circuit 42 might be running in the opposite direction to the charging current in order to not overload the electrical contact 20 and the respective contact surface 30 on the electric vehicle.

In the following, the method for verifying the contact between the charging station 10' and the electric vehicle 12 will be explained. It might be applied to any of the above described embodiments of the charging station 10'. The method for verifying the contact might comprise:

arranging the contact arrangement 29 to contact the same contact surface 34 of the electric vehicle 12; and measuring the electric impedance between the electrical contact 24 of the contact arrangement 29 and the secondary contact 28 of the contact arrangement 29.

Further, the method might comprise measuring the electric impedance by determining the current when a predetermined voltage is applied between the electrical contact 24 of the contact arrangement 29 and the secondary contact 28 of the contact arrangement 29. Alternatively, the method might also comprise determining the voltage between the electrical contact 24 of the contact arrangement 29 and the secondary contact 28 of the contact arrangement 29 when a predetermined current is sent through the electrical contact 24 of the contact arrangement 29 and the secondary contact 28 of the contact arrangement 29.

In a further embodiment, the electrical connection between the charging station and the electrical vehicle is established by an electrical cable comprising a plug for establishing the electrical connection to a corresponding plug of the electric vehicle. For example, such charging stations are well known for charging electric cars. Instead of attaching the electrical contacts and the secondary contact to the above described movable contact frame, the electrical contacts as well as the secondary contact are hold within the plug. The plug is typically handled by a person. Alternatively, the plug might also be handled by a robot.

Further, as can be seen in FIG. 2, the plurality of electrical contacts 20, 22, 23, 24, 25 can be bar-shaped. Also the contact surfaces on electric vehicle might be embodied by bar-shaped contacts, which are arranged essentially perpendicular to the electrical contacts 20, 22, 23, 24, 25 of the charging station. Other arrangement are also possible. Further, the plurality of electrical contacts are preferably pressed to the corresponding contact surfaces on the electric vehicle by a suitable means so that under normal conditions a good electrical contact is established. For this purpose, each electrical contact of the plurality of electrical contacts might be spring-loaded. The same applies to the secondary contact or, if a plurality of secondary contacts is used, to each of the secondary contacts.

Figure 4:
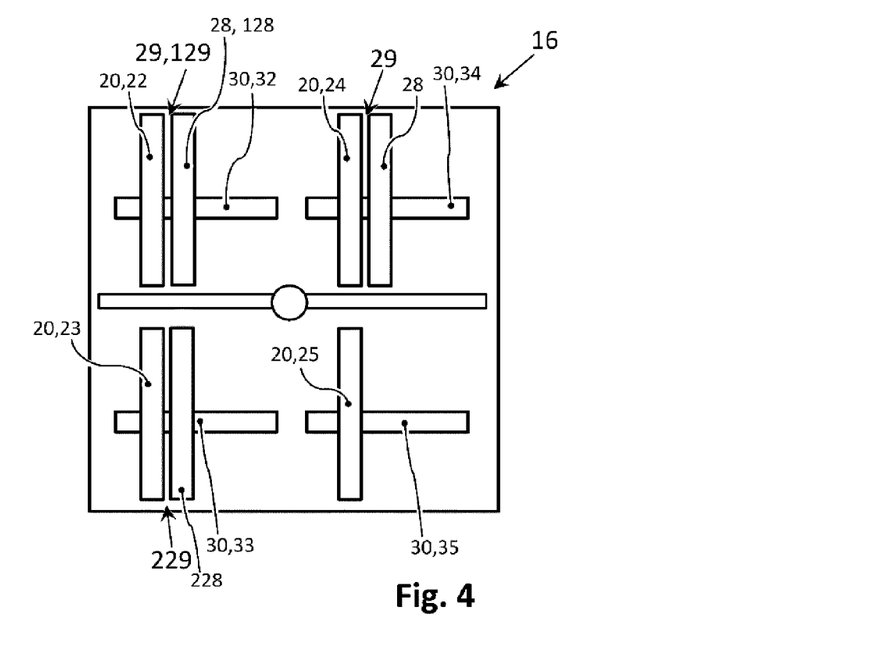
FIG. 4 shows a schematic view of a movable contact frame according to a second embodiment comprising a plurality of electrical contacts and contact surfaces on the electric vehicle to be contacted by the plurality of electrical contacts.

In FIG. 4 an example is shown having three contact arrangements. The first contact arrangement 29 is formed as in FIG. 2 by the electric contact 24, which is the protective earth contact, and the respective secondary contact 28 of the contact arrangement 29. The second contact arrangement 129 is formed by the electric contact 22, which is the negative electric contact, and the respective secondary contact 128 of the contact arrangement 129. The third contact arrangement 229 is formed by the electric contact 23, which is the negative electric contact, and the respective secondary contact 228 of the contact arrangement 229. It should be noted that also all electrical contacts could be part of a respective contact arrangement.

The method and arrangement for measuring the electric impedance between the negative electric contact 22 of the contact arrangement 129 and the respective secondary contact 128 of the second contact arrangement 129 might be equivalent as for the contact arrangement 29 comprising the protective earth contact 24 and which has been described above with respect to FIG. 2 and FIG. 3. However, also an alternative possibility might be used which is described next with respect to FIG. 5. The same applies to the method and the arrangement for measuring the electric impedance between the positive electric contact 23 of the third contact arrangement 229 and the respective secondary contact 228 of the third contact arrangement 229.

Figure 5:
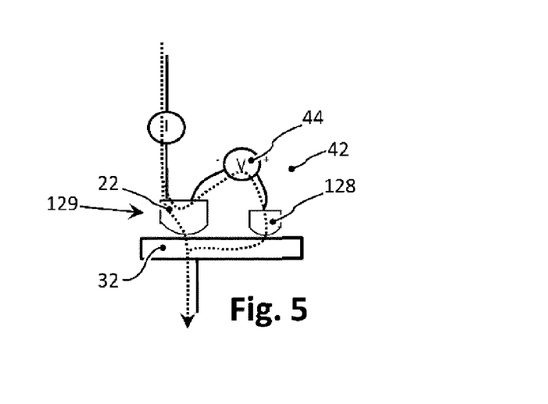
FIG. 5 shows a schematic view of a contact arrangement according to a second embodiment comprising one of the electrical contacts and a secondary contact.

FIG. 5 shows one of the electric contact surfaces 30 through which during charging a current I is flowing. In the example shown in FIG. 5 the contact surface 32 contacted by the negative electric contact 22 is shown. Further, the contact surface 32 is also contacted by the secondary contact 128 of the contact arrangement 129. Further, currents are shown by dotted lines. As shown, a first current path goes from the negative electric contact 22 directly to the contact surface 32. A second current path goes from the negative electric contact 22 to the secondary contact 128 through the voltage measurement device 44 and further to the contact surface 32. In order to determine the impedance, the voltage between the electrical contact 22 and the secondary contact 128 is measures by the voltage measurement device 44.

Figure 6:
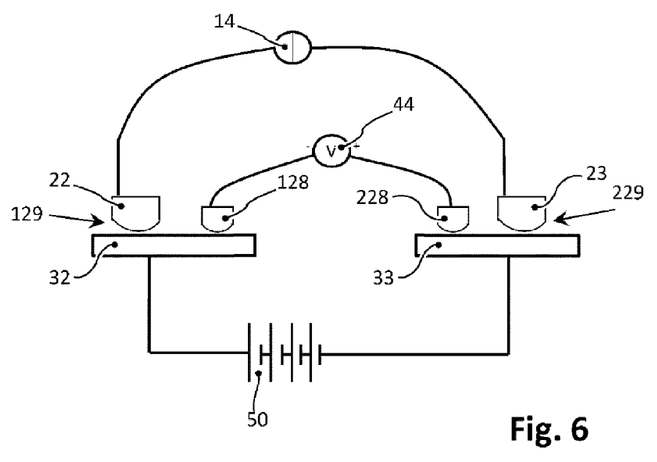
FIG. 6 shows a schematic arrangement of a contact arrangement according to another embodiment comprising one of a first contact arrangement and a second contact arrangement.

FIG. 6 shows another embodiment according to the invention. In this embodiment a first contact arrangement and a second contact arrangement are used to measure the contact impedance of the electrical contacts. In the example shown in FIG. 6, the first contact arrangement 129 is the one with the negative electric contact 22 and the respective secondary contact 128. The second contact arrangement 229 is the one with the positive electric contact 23 and the respective secondary contact 228. For charging the battery or any other suitable energy storage 50 of the electric vehicle 12, the energy storage 50 is electrically connected to the contact surface 32 corresponding to the electric contact 22 as well as to the contact surface 33 corresponding to the electric contact 23. Further, the power supply 14 is electrically connected to the negative electric contact 22 and to the positive electric contact 23. In order to measure the contact impedance of the electrical contact 22 of the first contact arrangement 129 to the respective contact surface 32 and of the electrical contact 23 of the second contact arrangement 229, the secondary contact 28 of the first contact arrangement 129 and the secondary contact 28 of the second contact arrangement 229 are electrically connected to the voltage measurement device 44. By measuring the voltage with the voltage measurement device 44 at a given current provided by the power supply 14, the impedance can be determined.

REFERENCE SIGNS LIST

10 device for charging an electric vehicle
10' charging station
12 electric vehicle
14 power supply
16 movable contact frame
17 actuator
18 fixed support frame
20 plurality of electrical contacts
22 electrical contact, e.g. negative electric contact
23 electrical contact, e.g. positive electric contact
24 electrical contact e.g. protective earth contact
25 electrical contact, e.g. control contact
28 secondary contact
29 contact arrangement
30 contact surfaces on electric vehicle
32 contact surface corresponding to electric contact 22
33 contact surface corresponding to electric contact 23
34 contact surface corresponding to electric contact 24
35 contact surface corresponding to electric contact 25
40 voltage source or current source
42 closed electrical circuit
44 voltage measurement device
50 energy store

The invention claimed is:

1. A device for charging an electric vehicle, comprising:
a plurality of electrical contacts, at least two of them coupled to a stationary power supply, and each electrical contact of the plurality of electrical contacts is arranged for contacting a different contact surface of the electrical vehicle to be charged by the device; and
a secondary contact forming a contact arrangement with one of the electrical contacts of the plurality of electrical contacts,
wherein said electrical contact and the secondary contact of the contact arrangement are arranged to contact the same contact surface of the vehicle, and the contact arrangement formed by the electrical contact and the respective secondary contact is a first contact arrangement and a second contact arrangement is formed by one of the electrical contacts of the plurality of electrical contacts which is not part of the first contact arrangement and a respective secondary contact of the second contact arrangement wherein the electrical contact of the second contact arrangement and the secondary contact of the second contact arrangement are arranged to contact the same contact surface of the vehicle, and wherein the device is configured for measuring an electric impedance between the secondary contact of the first contact arrangement and the secondary contact of the second contact arrangement.

2. The device according to claim 1, wherein the device is further configured for enabling and/or maintaining the supply of power to the vehicle via the at least two electrical contacts coupled to the power supply only when the measured electric impedance is below a predetermined threshold.

3. The device according to claim 1, comprising
a fixed support frame and
a movable contact frame to which the plurality of electrical contacts are attached, and
an actuator attached to the fixed support frame for moving the movable contact frame to engage the plurality of electrical contacts with the respective contact surface of the electrical vehicle.

4. The device according to claim 1, wherein the plurality of electrical contacts comprise at least one electrical contact of the following list: a negative direct current contact, a positive direct current contact, a control contact and a protective earth contact.

5. The device according to claim 4, wherein the device comprises the negative direct current contact, the positive direct current contact, the control contact and the protective earth contact.

6. A method for verifying the contact between a device for charging an electric vehicle and an electric vehicle, the device comprising
a plurality of electrical contacts, at least two of them coupled to a power supply, and each of the electrical contacts is arranged for contacting a different contact surface of the electrical vehicle; and
a secondary contact, forming a contact arrangement with one of the electrical contacts, wherein the electrical contact of the contact arrangement and the secondary contact of the contact arrangement are arranged to contact the same contact surface of the vehicle;
wherein the contact arrangement formed by the electrical contact and the respective secondary contact is a first contact arrangement and a second contact arrangement is formed by one of the electrical contacts of the plurality of electrical contacts which is not part of the first contact arrangement and a respective secondary contact of the second contact arrangement wherein the electrical contact of the second contact arrangement and the secondary contact of the second contact arrangement are arranged to contact the same contact surface of the vehicle,
and wherein the method comprises:
arranging the contact arrangement to contact the same contact surface of the vehicle; and measuring an electric impedance between the secondary contact of the first contact arrangement and the secondary contact of the second contact arrangement.

7. The method according to claim 6, comprising applying a current of at least 10 amperes during measuring the electric impedance.

8. The method according to claim 6, comprising applying a switched or pulsed current during measuring the electric impedance.

\* \* \* \* \*